April 14, 1953 D. G. MAGILL ET AL 2,634,563
METHOD OF PRODUCING BULGED CONTAINERS
Original Filed Feb. 12, 1946 2 SHEETS—SHEET 1
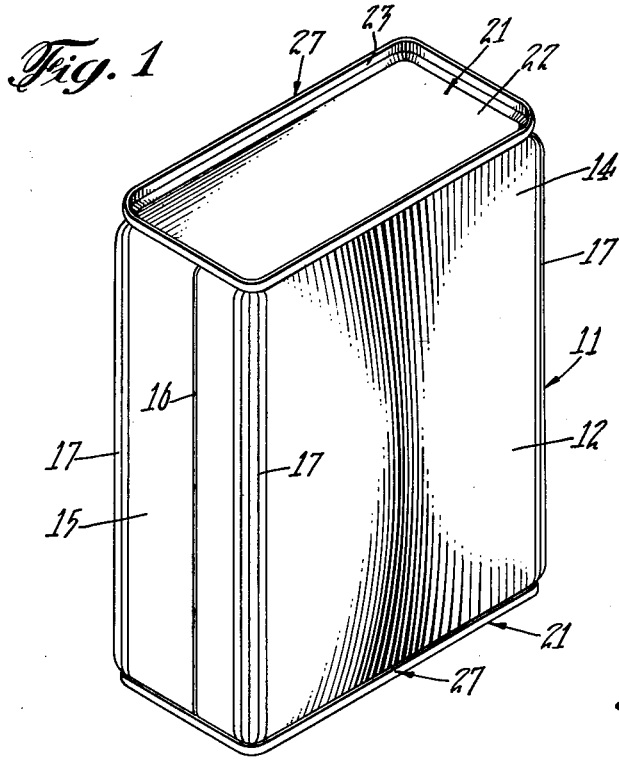
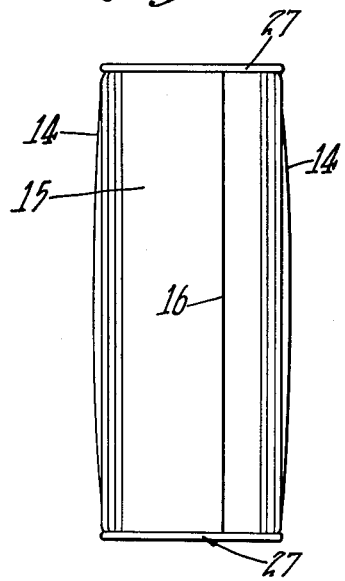
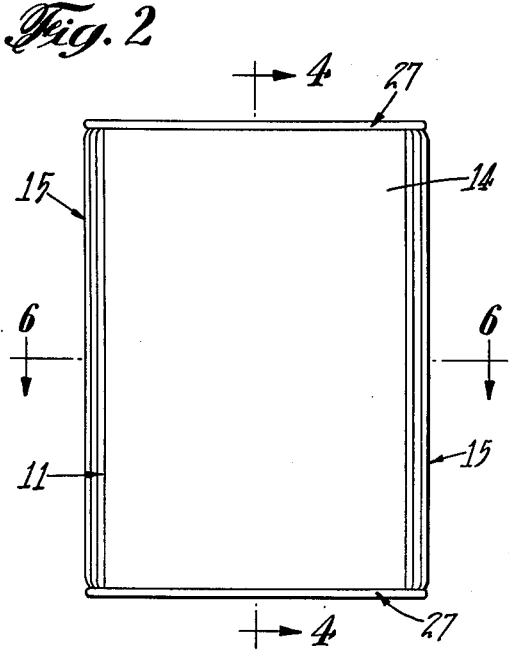
INVENTORS
DONALD G. MAGILL
RICHARD P. BIGGER
BY Charles H. Erne
Ivan D. Thornburgh
ATTORNEYS April 14, 1953 D. G. MAGILL ET AL 2,634,563
METHOD OF PRODUCING BULGED CONTAINERS
Original Filed Feb. 12, 1946 2 SHEETS—SHEET 2
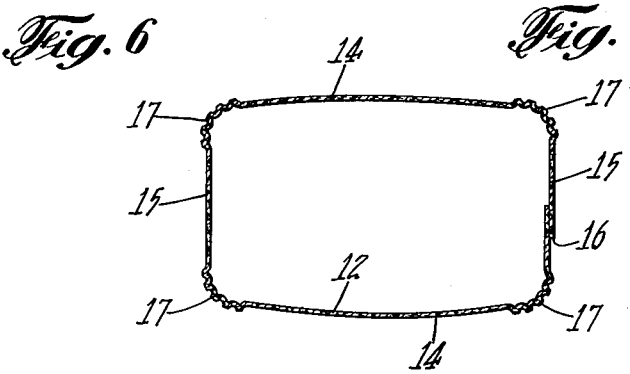
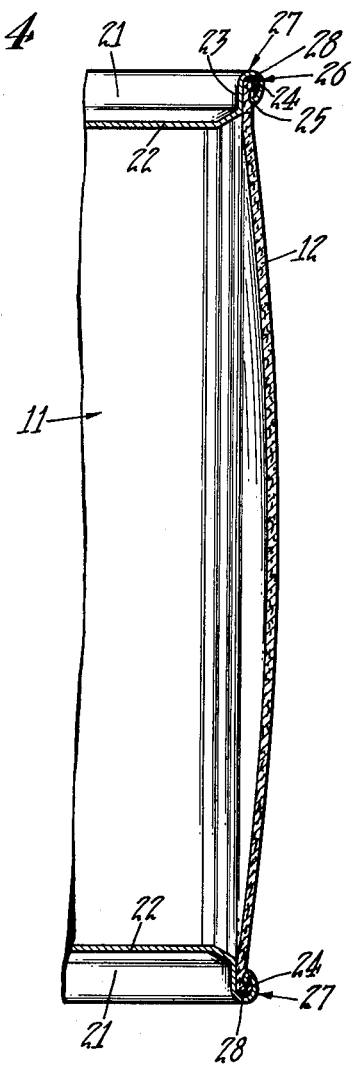
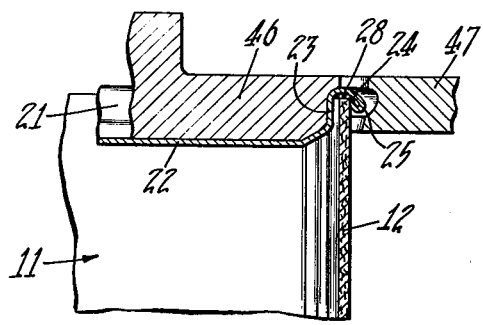
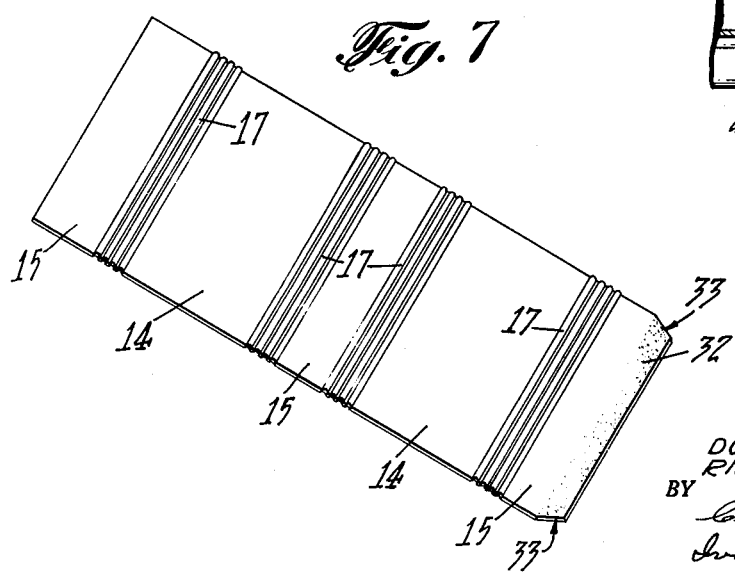
INVENTORS
DONALD G. MAGILL
RICHARD P. BIGGER
BY
Charles H. Eine
Ivan D. Thornburgh
ATTORNEYS Patented Apr. 14, 1953

2,634,563

UNITED STATES PATENT OFFICE 2,634,563

METHOD OF PRODUCING BULGED CONTAINERS

Donald G. Magill, Great Neck, N. Y., and Richard P. Bigger, Stanton, N. J., assignors to American Can Company, New York, N. Y., a corporation of New Jersey Original application February 12, 1946, Serial No. 647,132, now Patent No. 2,561,391, dated July 24, 1951. Divided and this application December 13, 1950, Serial No. 200,658

3 Claims. (Cl. 53—11)

The present invention relates to a method of producing containers for frozen food products and has particular reference to producing a semirigid form of container having bulged side walls which facilitate the freezing of the product in the container and which invention provides a unitary package which can be automatically filled and sealed and utilized for marketing and satisfactorily protecting the product.

This is a division of our United States patent application Serial No. 647,132, filed February 12, 1946, on Frozen Food Container which issued as Patent No. 2,561,391, dated July 24, 1951.

In some methods of quick freezing food products in containers an essential step of the method is intimate contact of the container walls with portions of the freezing apparatus so that absorption of the heat from the product may be rapidly effected. This transfer of heat must be effected through the walls of the container and through any other intervening walls or layers such as inner liners, outer wrappers, labels, etc. For best results it has been found that more rapid and more efficient freezing can be obtained when these intervening walls are reduced to a minimum as regards thickness or number of layers consistent with adequate product protection and are arranged for firm contact with the freezing apparatus.

The instant invention contemplates overcoming the difficulties and disadvantages of prior containers by the provision of a container of semirigid construction in which liners and wrappers are eliminated so that only a single flexible wall intervenes between the food product to be frozen and the freezing apparatus.

An object of the invention is the provision of a method of producing a container for frozen foods wherein the container is a complete unitary package, without the use of inner liners or bags or outer wrappers or labels, and which may be printed at the place of manufacture and which eliminates the usual setting up or assembly of a number of separate parts prior to filling and sealing.

Another object is the provision of a method of producing such a container wherein the side walls of the container are bulged outwardly and are flexible and are adapted to yield under pressure of a freezing apparatus to insure firm contact with the apparatus during the freezing operation for the rapid and efficient transfer of heat through the wall of the container to effect complete and rapid freezing of the enclosed product.

Another object is the provision of a method of producing such a container wherein the bulging of the side walls of the container is effected by the application of the end members to the body of the container.

Another object is the provision of a method of producing such a container wherein the end wall dimensions of the container closure members are made relatively shorter than the end wall dimensions of the container body and the marginal edge portions of the side walls of the container body are forced inwardly to fit the closure members when the closure members are applied to the body and clinched in place, to produce a bidirectional yieldable or flexible bulge in the container side walls extending from one closure member to the other and from one corner of the body to the other, so that the bulged opposed side walls provide an intermediate cross-sectional container body dimension of a materially greater area than the corresponding over-all dimension of the closure members.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a container made in accordance with the method steps of the instant invention;

Fig. 2 is a side elevation of the container shown in Fig. 1;

Fig. 3 is an end elevation of the container;

Fig. 4 is an enlarged sectional view of the container taken substantially along the line 4—4 in Fig. 2, with parts broken away;

Fig. 5 is an enlarged sectional view of one corner of the container showing how the end members of the container are secured in place, the view also showing principal parts in section of an apparatus for performing this closing operation;

Fig. 6 is a transverse section taken substantially along the line 6—6 in Fig. 2; and Fig. 7 is a perspective view of a flat blank from which the container body is made.

As a preferred embodiment of the invention the drawings illustrate a method of making a rectangular shaped, semirigid container 11 for frozen food products. Such a container includes a tubular fibre body 12 of rectangular cross-section having broad or wide side walls 14 and comparatively narrow end walls 15, the end walls being approximately one half the width of the side walls. A lap type side seam 16 is disposed in one of the end walls 15. The corner of the body are rounded and are preferably re-enforced by a plurality of closely spaced and parallel vertically disposed corrugations, beads or scores 17. These corrugations, beads or scores provide a corner radius and facilitate the assembly of the end members to the container body. They also provide a means for taking up or absorbing the excess material produced by the flattening of the bulged side walls, especially during the plate type freezing operation.

All surfaces of the body including its edges preferably are impregnated with and/or carry a surface coating or film of a suitable liquid and moisture vapor proofing substance to protect the frozen product contents of the container against leakage and dehydration. In some cases either the inner or outer surface only of the body may carry a film or layer of the coating substance.

Suitable coating materials for this type of container are for example: hydrocarbon waxes of mineral origin, or wax-like materials of vegetable or animal origin, with or without suitable modifiers; natural or synthetic resins with or without suitable modifiers, and/or natural or synthetic rubber derivatives with or without suitable modifiers; or any combination of the foregoing.

The open ends of the fibre body 12 are closed with rectangular shaped metal top and bottom end members 21. These end members are formed with a countersunk panel wall 22 which merges into a surrounding or peripheral upright friction or countersink wall section 23. The friction or countersink wall section initially fits loosely within the end of the body and engages against the inner surface thereof when the end member is finally secured to the body. Adjacent the outer edge of the body the countersink wall section 23 extends outwardly over the edge, providing a gasket receiving channel and terminates in a peripheral flange 24 which extends down against the outside of the body and is crimped tightly in place.

The terminal edge of the flange 24 is formed with an inwardly extending edge curl or hem 25 which is imbedded or pressed into the outer surface of the fibre body walls. Thus the upright wall section 23 and the crimped flange 24 set off a peripheral channel 26 which seals the outer coated edges of the body and provides an end seam 27 which is liquid tight and substantially moisture vapor proof. Where the inner surfaces only of the body are liquid and substantially moisture vapor proofed a lining compound 28 may be used in the channel 26 to seal the edges of the body. Or this lining compound 28 may be used as an additional sealing medium even in cases where all parts of the fibre body have first been liquid-proofed and substantially moisture vapor proofed.

The width of the end members 21 is preferably slightly smaller than the width of the inside of the body 12. With such an end member secured to the body the outer periphery of the end seams 27, along the narrow end walls 15 of the body is substantially flush with the body end walls as best shown in Fig. 2. These end walls are straight from top to bottom. Along the wider side walls 14, the end members draw the body wall inwardly at the end seams and thus impart a curved or bellied effect to these side walls in two directions, i. e., along both the width and height of the walls, as best shown in Figs. 3 and 4. The end seams along these walls are therefore set back, inwardly of the body walls. It is this curved effect in the walls that renders them yieldable and flexible to insure firm contact of the major part of the surface of the side walls with the freezing apparatus during the freezing of the product enclosed in the container and also effectively insures intimate contact between juxtaposed container walls.

As an alternative manner of securing the end members 21 to the ends of the fibre body both the width and length of the end members may be made slightly shorter than the corresponding dimensions of the body, thereby obtaining a curved or bellied effect on both the wide side walls 14 and the narrow end walls 15 of the body.

To open the container it is merely necessary to pry off one of the end members 21. Any suitable hook nosed tool may be utilized for this purpose. Or, if desired, the fibre body adjacent one of the end members may be readily cut through with a knife to remove the end member. In either case, a full open mouth is provided by the removal of the end member. By means of this full open mouth the frozen contents may be easily removed as a unit if desired. Also, since the container is liquid-proof and free of any inner liners and outer wrappers the frozen product may be readily thawed out in the container before opening.

In accordance with the method steps of producing such a semirigid container for frozen food products, the fibre body 12 is first provided. This body preferably is made from a single flat blank (Fig. 7) of suitable paper board.

Examples of such suitable paper board are sulphate or sulphite boards, or combinations of these with ground wood pulp.

In order to provide a container which is completely sanitary it is preferred to make the paper board from all-virgin pulp, both the pulp and the board being produced under bacteriologically controlled conditions.

Along one transverse edge the inner face of the blank is coated with an adhesive 32. The corners of the blank adjacent this edge are preferably formed with tapered notches 33 for the side seams. At spaced intervals along the blank, the re-enforcing beads or corrugations 17 are formed therein extending transversely thereof and setting off the side and end walls 14, 15 for the body and re-enforcing the rounded corners of the finished body. Such a blank is preferably folded over a mandrel, horn or other forming device and its transverse terminal edges brought together in overlapping relation and secured together under pressure by the adhesive 32 to provide the body 12 having the side seam 16.

The formed body 12 may then be immersed in a bath of one of the coating materials hereinbefore mentioned. This immersion of the body impregnates it with the coating material and supplies a surface film of the coating material on all surfaces including its edges. In some cases where it is desirable to keep the outer surface free of the coating substance, the inner surfaces only may be sprayed or otherwise covered with the coating substance to liquid-proof and substantially moisture vapor proof the body. In other cases, it may be desirable to coat either the inner, or outer, or both surfaces of the material from which the body is made while the material is in the flat, or these surfaces may be coated by spraying or otherwise while still on the body making machine. After draining and/or drying the body is ready to receive its end members 21.

The bottom end member 21 is preferably first secured to the body 12. The resulting container is then filled with the product to be frozen or which may be pre-frozen, preferably without the use of any liner sheets or bags. This filling of the container may be effected automatically at high speed in the usual filling machines used for such purposes. After this filling operation the top end member 21 is secured in place on the filled container. This seals the container and renders it ready for introduction into the freezing apparatus for the freezing of the enclosed product.

In one form of a typical freezing apparatus the filled and sealed containers are placed between plates in which a refrigerant is circulated. These plates are pressed against the side walls of the containers with a hydraulic ram to insure rapid and efficient transfer of heat from the product within the containers to effect the freezing of the product. It is for this purpose that at least the side walls 14 of the container are bellied outwardly in two directions so that flexure of the side walls and a resulting firm contact of the freezing plates with the major portion of the wall surface of these fibre side walls, outwardly from the rigid metal edges of the opposite end seams 27, will be insured when such relatively flat plates are pressed against the containers.

This bellying of the container side walls 14 is brought about by the operation of applying the end members 21 to the ends of the body 12. For this purpose the width of the bodies is made slightly larger than the width of the end members to be secured to them as hereinbefore mentioned. Preferably the length of the end members is substantially the same as the length of the inside cross-sectional dimension of the body.

Thus when an end member is placed upon the end of the body the friction wall 23 thereof will snugly engage the inside of the narrow end walls 15 of the body and will loosely engage or remain inwardly spaced from the wider side walls 14 as shown in Fig. 5. With the body in this position a chuck 46 is inserted in the countersunk panel of the end member to back up its friction wall 23. The end member flange 24 is then forced inwardly against the outer surface of the body. As the flange 24 is bent into place it carries the marginal edge portion of the body along the side walls 14 inwardly with it and clamps it tightly against the backed-up friction wall 23 of the end member to form the clinched or crimped end seam 27. This bending action preferably is performed by a set of squeezer jaws 47 which surround the end of the container being operated upon and which together with the chuck 46 may form parts of a more elaborate machine conventionally used for this purpose.

This bending of the flange 24 into seam forming position bellies out the side walls 14 in a gradually curved section extending from one end member to the other. Transversely of the side walls the bellying action bends the side walls outwardly in a gradually curved section extending from one re-enforced corner to the other. Thus the entire outer wall surface of the two side walls 14 is formed as a flexible and yieldable convex or slightly dome shaped structure which provides firm contact of the entire wall surface of these side walls with the freezing apparatus during the freezing operation.

During the end seam forming and container closing operation, the narrow end walls 15 of the body resist any bellying of these walls and thus the latter remain straight. This is brought about by the snug fit of the end member friction wall 23 between the end walls 15 of the body when the end seams 27 are formed. The seams are thus maintained substantially flush with the outer surfaces of these relatively narrow end walls.

As previously pointed out, in some desired cases, both the width and the length dimension of the end members may be made slightly shorter than the corresponding dimensions of the body. This does not interfere with the end seam crimping operation but results in both side and end walls being outwardly curved or bowed.

While fibre stock for the container body and metal stock for the container ends have preferably been mentioned herein, it is of course understood that the scope of the invention includes other suitable materials. For example, the complete container may consist entirely of metal or entirely of fibre, or a combination of suitable materials may be used in its construction.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. The method of producing a semirigid container filled with a comestible to be frozen therein, comprising inserting the countersink wall of a rectangular metallic end member into one end of a tubular rectangular fibre body having straight end walls and opposed straight side walls spaced apart a distance greater than the transverse dimension of said end member countersink wall disposed therebetween, said countersink wall having a laterally projecting peripheral flange, bending said end member flange inwardly against said body walls to secure the end member thereto in a crimped seam thereby forcing said opposed body side walls inwardly against said end member countersink wall to reduce the space between said side walls adjacent said end member, filling said body thus closed at one end with a comestible to be frozen, similarly inserting the countersink wall of a second identical metallic end member into the opposite end of said filled tubular body while maintaining the same relative dimensional characteristics aforesaid, and bending the second end member flange inwardly against the body walls to secure the end member thereto in a crimped seam, thereby sealing the container and similarly reducing the space between said body side walls adjacent said second seam and cooperating with said first mentioned seam and the container contents to impart to said body side walls a bi-directional flexible outward bulge extending between said end members and also extending between said straight body end walls, said outwardly bulged side walls being yieldable inwardly under external pressure for insuring firm and intimate contact of the major surface portion of said opposed side walls with a freezing apparatus to effectively freeze the contained comestible.

2. The method of producing a semirigid container for a comestible to be frozen therein, comprising inserting the countersink wall of a rectangular metallic end member into one end of a tubular rectangular fibre body having straight end walls and opposed straight side walls spaced apart a distance greater than the transverse dimension of said end member countersink wall disposed therebetween, said countersink wall having a laterally projecting peripheral flange, bending said end member flange inwardly against said body walls to secure the end member thereto in a crimped seam thereby forcing said opposed body side walls inwardly against said end member countersink wall to reduce the space between said side walls adjacent said end member, similarly inserting the countersink wall of a second identical metallic end member into the opposite end of said filled tubular body while maintaining the same relative dimensional characteristics aforesaid, and bending the second end member flange inwardly against the body walls to secure the end member thereto in a crimped seam, thereby similarly reducing the space between said body side walls adjacent said second seam and cooperating with said first mentioned seam to impart to said body side walls an outward bulge extending from one of said end members to the other, said outwardly bulged side walls being yieldable inwardly under external pressure for insuring firm and intimate contact of the major surface portion of said opposed side walls with a freezing apparatus to effectively freeze a contained comestible.

3. A method of producing a semirigid container for frozen food products wherein the products are frozen after filling in the container, comprising the steps of providing a tubular fibre body of rectangular cross-sectional configuration and providing metal end members for said body, said end members each having a substantially rectangular countersunk panel surrounded by a countersink wall terminating in a laterally projecting peripheral flange, the distance between opposite sides of said countersink wall being less than the distance between opposite sides of said body in an initial loose assembly with said body, and securing said end members to said body by springing a pair of the body walls adjacent opposite extremities of said body inwardly against said countersink walls by bending said end member flanges inwardly and tightly against the outer peripheral surface of said body to secure said end members to said body and to provide an outwardly extended bulge in the midportion of said body, whereby a food product filled within the container may be rapidly frozen.

DONALD G. MAGILL.
RICHARD P. BIGGER.

References Cited in the file of this patent

UNITED STATES PATENTS

| Number | Name | Date |
|---|---|---|
| 654,253 | Hunter | July 24, 1900 |
| 2,168,231 | McLain et al. | Aug. 1, 1939 |
| 2,455,063 | Jackson | Nov. 30, 1948 |

FOREIGN PATENTS

| Number | Country | Date |
|---|---|---|
| 337,655 | Italy | Mar. 10, 1936 |